May 22, 1956  A. G. COBLE  2,746,459

SMOKERS' PIPE

Filed March 6, 1953

INVENTOR.
ABRAM G. COBLE
BY
McMorrow, Berman + Davidson
ATTORNEYS

United States Patent Office 2,746,459
Patented May 22, 1956

2,746,459

SMOKER'S PIPE

Abram G. Coble, Webster City, Iowa; L. G. Hix, guardian of the property of said Abram G. Coble Application March 6, 1953, Serial No. 340,695

2 Claims. (Cl. 131—214)

This invention relates to improvements in smokers' pipes of the type having a moisture collection trap.

One important object of the present invention is to provide a pipe as stated which will include a trap and bowl assembly so designed as to permit the same to be disassembled completely whenever desired, thereby to facilitate cleaning thereof.

Still another object of importance is to provide a trap and bowl assembly having separable parts any of which can be replaced as necessary, thereby to permit use of the pipe over an indefinite period of time.

Yet another object is to provide a pipe as described which will include a tubular plug extending upwardly from the trap within an opening formed in the bottom of the bowl portion of the pipe, said plug being spaced inwardly from the wall of the opening through which it extends, so as to permit moisture to flow exteriorly of the plug into the trap, the plug being adapted to receive a piece of briar or similar material.

Another object is to provide, in a pipe as described, a removable, apertured bottom piece for the bowl, said bottom piece having its aperture proportioned to receive said plug, the bottom piece being so formed as to permit connection of the trap member to the bowl in a manner effective to tightly and sealably join the trap member and bowl to one another.

Yet another object is to provide a pipe as stated having a stem portion compositely formed from a plurality of readily separable pieces, thereby to facilitate cleaning of said stem portion, said stem portion being in part formed from complementary stem sections adapted to fall away from one another when disconnected, in such a manner as to fully expose the inner surfaces of said sections for cleaning.

Other objects will appear from the following description, the claims appended thereto, and from the annexed drawing, in which like reference characters designate like parts throughout the several views, and wherein:

Figure 1:
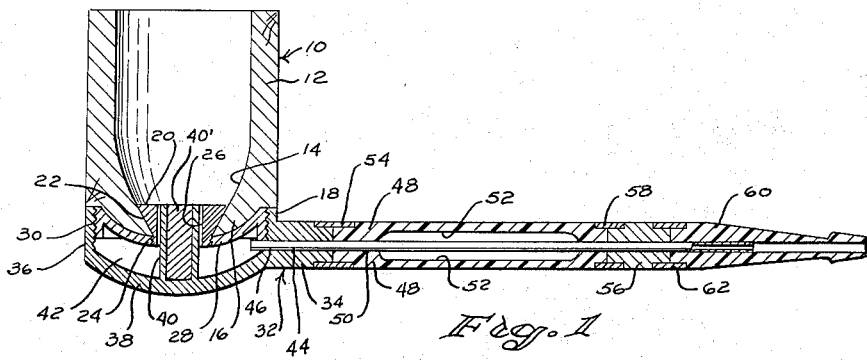
Figure 1 is a longitudinal sectional view taken through a smoker's pipe formed in accordance with the present invention.
Figure 2:
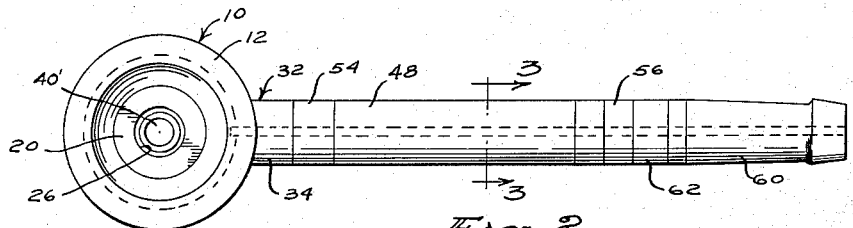
Figure 2 is a top plan view.

The illustrated pipe includes a bowl designated generally by the reference numeral 10. The bowl comprises a receptacle 12 for tobacco, said receptacle being of cylindrical formation. The receptacle 12, at its lower end, has its inner surface tapered as at 14 in the direction of the lower end of the receptacle, said lower end of the receptacle being formed open and having a tapered, annular, inwardly extended lip 16 surrounding the opening at the lower end of the receptacle. The outer surface of lip 16 merges into a downwardly facing circumferential shoulder 18 on the receptacle.

To provide a bottom for the receptacle, I utilize a wedge shaped plug 20 externally tapered complementarily to the taper of the surface 14 of the receptacle. The plug 20, thus, has a tapered outer surface 22 engageable against said surface 14 at the bottom of receptacle 12.

The plug 20 can be formed of any suitable material, such as a heat resistant plastic or the like. Plug 20, at its lower end, is integrally formed with a cylindrical, externally threaded extension 24, and disposed axially of the plug, and opening at opposite ends thereof, is a moisture drain opening 26.

Figure 4:
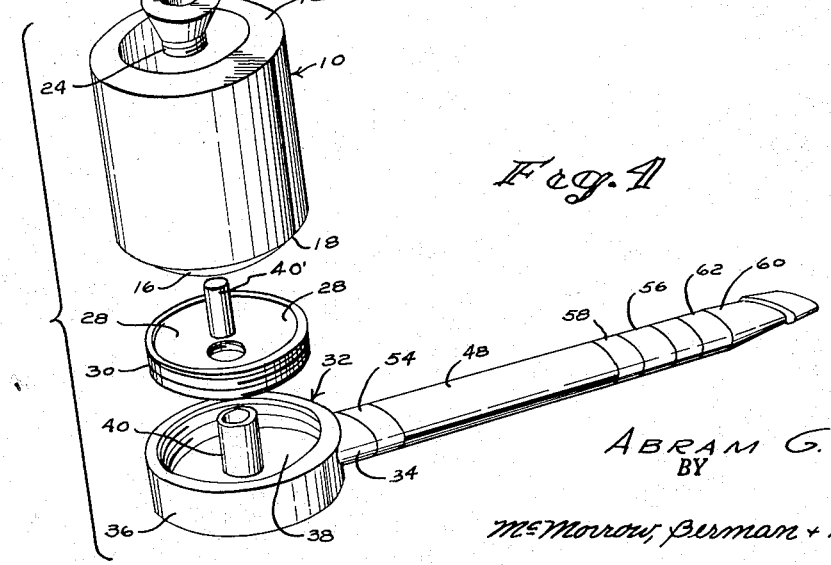
Figure 4 is an exploded perspective view.

A trap cover 28 is of circular outer configuration (Figure 4), said cover piece 28 having a dished or downwardly concaved center portion adapted to engage tightly against the lower or outer surface of the annular lip 16 of the receptacle. In the center of the cover piece is a threaded opening, in which is engageable the threaded extension 24 of the wedge member 20.

Integrally formed upon the periphery of the cover piece 28 of the trap is a depending cylindrical, exteriorly threaded flange 30, threadable into a trap designated generally at 32.

Trap 32 is integrally formed with an axially bored stub 34, said stub 34 projecting radially and outwardly from the sidewall of a circular, cup-like body 36 having a concavo convex bottom 38.

Integral with the center portion of the bottom 38, and projecting upwardly from said bottom, is a tubular boss 40. Boss 40 is open at its upper end, said upper end of the boss being coplanar with the flat top surface of plug 20. The upper end portion of boss 40 extends upwardly within center opening 26 formed in the plug, and as will be noted from Figure 1, the opening 26 is distinctly greater in diameter than the outer diameter of the boss, thereby to provide an annular passage for smoke. The smoke, as will be appreciated, will flow downwardly through said annular flow passage, into a moisture collection chamber 42 defined between bottom 38 of the trap cup and cover 28 of the trap.

The boss 40 is closed at its lower end by the center portion of the trap cup bottom 38, and it is proposed that a piece of briar or like material 40' will be snugly fitted in the boss, so as to form, in cooperation with the flat upper surface of the plug 20, a bottom for the pipe bowl.

Figure 3:
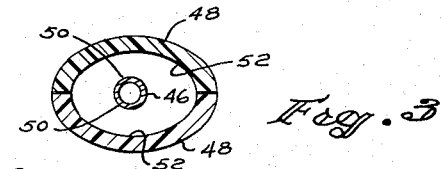
Figure 3 is a transverse sectional view, on an enlarged scale, through the stem, taken on line 3—3 of Figure 2.

The stub 34 provides the inner end of the pipe stem, and at that end of the stub remote from the trap cup, the pipe stem is formed with a pair of separable, longitudinally contacting, relatively elongated, intermediate stem sections 48. Stem sections 48 can be of plastic or similar material, and as shown in Figure 3, said stem sections, when placed in longitudinal contact with one another, cooperate to form an intermediate stem portion.

Each of the stem sections 48 has a longitudinal bore section 50 extending longitudinally thereof, each bore section 50 being of semi-circular cross sectional shape, said bore sections opposing one another to form a cylindrical bore in the intermediate stem portion, which bore communicates, at one end, with a longitudinal bore 44 formed in the stub 34.

Each of the stem sections 48 is also formed with a longitudinal depression 52, the depressions 52 opposing one another to form a longitudinal cavity within the intermediate stem portion, which cavity will be in communication, at its opposite ends, with the bore of said stem portion defined by the bore sections 50 of sections 48. A smoke tube 46 of metal or similar material is formed open at its opposite ends, and fits snugly in bore 44 of stub 34, and in the bore of the intermediate stem portion defined by sections 48.

For the purpose of connecting stub 34 to the intermediate stem portion, I provide a coupling sleeve 54 of metal or similar material, said sleeve engaging the stub and the section 48, at opposite ends of the sleeve.

That end of the intermediate stem portion remote from the bowl abuts against an axially bored connecting piece 56, the smoke tube extending through said connecting piece. A coupling sleeve 58 attaches the connecting piece 56 to the adjacent end of section 48. As will be appreciated, the stem sections are held, by coupling sleeves 54, 58 respectively, against separation during use of the pipe. However, at such time as the pipe is to be cleaned, the disengagement of sleeves 54, 58 from the opposite ends of sections 48 is effective to cause the sections 48 to fall away from one another, thereby to facilitate cleaning of the depressions 52 thereof.

Connecting piece 56, at that end thereof remote from the bowl, is connected to a bit or mouthpiece 60 by means of a coupling sleeve 62.

As will be noted, the entire pipe is formed of readily separable parts, thus facilitating maintenance of the pipe in a sanitary condition. Further, the pipe is so designed as to provide a trap having a concaved or depressed bottom, the bottom of said trap being disposed below the inner end of the smoke tube. In use of the pipe, inhalation will be effective to draw smoke through the annular passage 26, said smoke passing through the chamber 42 into the smoke tube 46. At the same time, moisture moving longitudinally of said smoke tube toward the bowl will flow out of the inner end of the tube into the depressed trap bottom, and will not travel upwardly within the flow passage 26 into the inside of the bowl.

The trap, of course, can itself be cleaned with facility, the top and bottom of the trap being separable from one another for this purpose. Further, the bottom of the bowl can be easily cleaned, since disengagement of the trap cover piece 28 from plug 20 will loosen wedge member 20 within the bowl, permitting the plug to be removed.

It is important to note, in this regard, that mere threading of the trap cover piece 28 upon the depending extension 24 of the plug will be effective to draw said wedge member downwardly within the pipe bowl, so as to wedgeably engage the plug in the bowl bottom, while at the same time binding the trap cover tightly against the underside of lip 16. A tight, sealed connection thus results.

It is believed apparent that the invention is not necessarily confined to the specific use or uses thereof described above since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claims.

What is claimed is:

1. In a smoking pipe, a substantially cylindrical bowl having a tobacco chamber therein and a lower end, said chamber having a downwardly tapering bottom having the lowermost portion provided with a vertical opening, a plug comprising a wedge shaped portion fitting said tapering bottom, said wedge-shaped portion having a lower end depending through said opening, a cover piece on said lower end portion conformably engaging the lower end of the bowl, said wedge shaped portion and said cover piece having a vertical axial opening therethrough, said cover piece being threaded on the lower end portion of the plug, said cover piece having a depending peripheral flange, a trap cup having a sidewall threaded on said depending flange and a bottom spaced downwardly from said cover piece, said cover piece constituting a trap cup cover, a central boss on and rising from said trap cup bottom through the passage through the plug, a radial stub on the cup sidewall and a smoke tube having an open inner end extending through said stub and communicating with the interior of the trap cup, said boss being smaller in diameter than said plug opening and defining a smoke passage communicating with the interior of the bowl and the interior of the trap cup.

2. In a smoking pipe, a substantially cylindrical bowl having a tobacco chamber therein and a lower end, said chamber having a downwardly tapering bottom having the lowermost portion provided with a vertical opening, a plug comprising a wedge shaped portion fitting said tapering bottom, said wedge-shaped portion having a lower end depending through said opening, a cover piece on said lower end portion conformably engaging the lower end of the bowl, said wedge shaped portion and said cover piece having a vertical axial opening therethrough, said cover piece being threaded on the lower end portion of the plug, said cover piece having a depending peripheral flange, a trap cup having a sidewall threaded on said depending flange and a bottom spaced downwardly from said cover piece, said cover piece constituting a trap cup cover, a central boss on and rising from said trap cup bottom through the passage through the plug, a radial stub on the cup sidewall and a smoke tube having an open inner end and extending through said stub and communicating with the interior of the trap cup, said boss being smaller in diameter than said plug opening and defining a smoke passage communicating with the interior of the bowl and the interior of the trap cup, said cover piece and the bottom of the trap cup having similarly curved and vertically spaced interior wall portions defining a concavo-convex trap chamber with the inner end of the smoke tube entering the trap chamber at a level above the trap cup bottom.

References Cited in the file of this patent

UNITED STATES PATENTS

| Number | Name | Date |
| --- | --- | --- |
| 302,412 | Kilroy | July 22, 1884 |
| 521,404 | Demuth | June 12, 1894 |
| 1,955,099 | Silverthorne | Apr. 17, 1934 |
| 2,276,266 | Benjamin et al. | Mar. 17, 1942 |
| 2,385,312 | Swift | Sept. 18, 1945 |
| 2,391,548 | Comptois | Dec. 25, 1945 |
| 2,581,169 | Bugg | Jan. 1, 1952 |
| 2,619,969 | Doty | Dec. 2, 1952 |
| 2,649,762 | Di Federico et al. | Aug. 25, 1953 |

FOREIGN PATENTS

| Number | Country | Date |
| --- | --- | --- |
| 697,036 | France | Oct. 21, 1930 |
| 565,442 | Great Britain | Nov. 10, 1944 |